United States Patent
Krabb

(10) Patent No.: US 7,787,017 B2
(45) Date of Patent: Aug. 31, 2010

(54) DIGITAL CAMERA AND METHOD FOR IDENTIFICATION OF OBJECTS

(75) Inventor: Helmut Krabb, Saalfelden (AT)

(73) Assignee: OptigraP Sagl, Mendrisio (CH)

( * ) Notice: Subject to any disclaimer, the term of this patent is extended or adjusted under 35 U.S.C. 154(b) by 1768 days.

(21) Appl. No.: 09/859,895

(22) Filed: May 16, 2001

(65) Prior Publication Data

US 2002/0018655 A1 Feb. 14, 2002

(30) Foreign Application Priority Data

May 18, 2000 (DE) ................................ 100 24 559
May 18, 2000 (DE) ................................ 200 08 999

(51) Int. Cl.
*H04N 5/228* (2006.01)
(52) U.S. Cl. .................................. 348/208.14; 348/169
(58) Field of Classification Search ................. 348/222, 348/86, 88, 94, 95, 169, 208.14; 382/141, 382/151, 111
See application file for complete search history.

(56) References Cited

U.S. PATENT DOCUMENTS

| 4,590,607 | A | * | 5/1986 | Kauth | 382/294 |
| 5,353,356 | A | * | 10/1994 | Waugh et al. | 382/143 |
| 6,005,959 | A | * | 12/1999 | Mohan et al. | 382/110 |
| 6,394,557 | B2 | * | 5/2002 | Bradski | 382/103 |
| 6,424,752 | B1 | * | 7/2002 | Katayama et al. | 382/284 |
| 6,456,328 | B1 | * | 9/2002 | Okada | 348/699 |

* cited by examiner

*Primary Examiner*—Gevell Selby
(74) *Attorney, Agent, or Firm*—Lackenbach Siegel LLP; Myron Greenspan

(57) ABSTRACT

The invention concerns a method for identification of stationary or moving objects such as images, texts or physical items on the basis of a digital representation (308), to be learned, of the object or of a part of the object. Within the representation (308) to be learned or within a detail (310), a search window (312) is initially selected here which occurs only once within the representation (308) to be learned or within the detail (310). At least one search detail (314, 316, 318) within the search window (312) is then selected, and forms the basis for the object identification. The invention further relates to a digital camera, in particular for image processing in an industrial environment.

2 Claims, 18 Drawing Sheets

DIGITAL CAMERA AND METHOD FOR IDENTIFICATION OF OBJECTS

Figure 1:
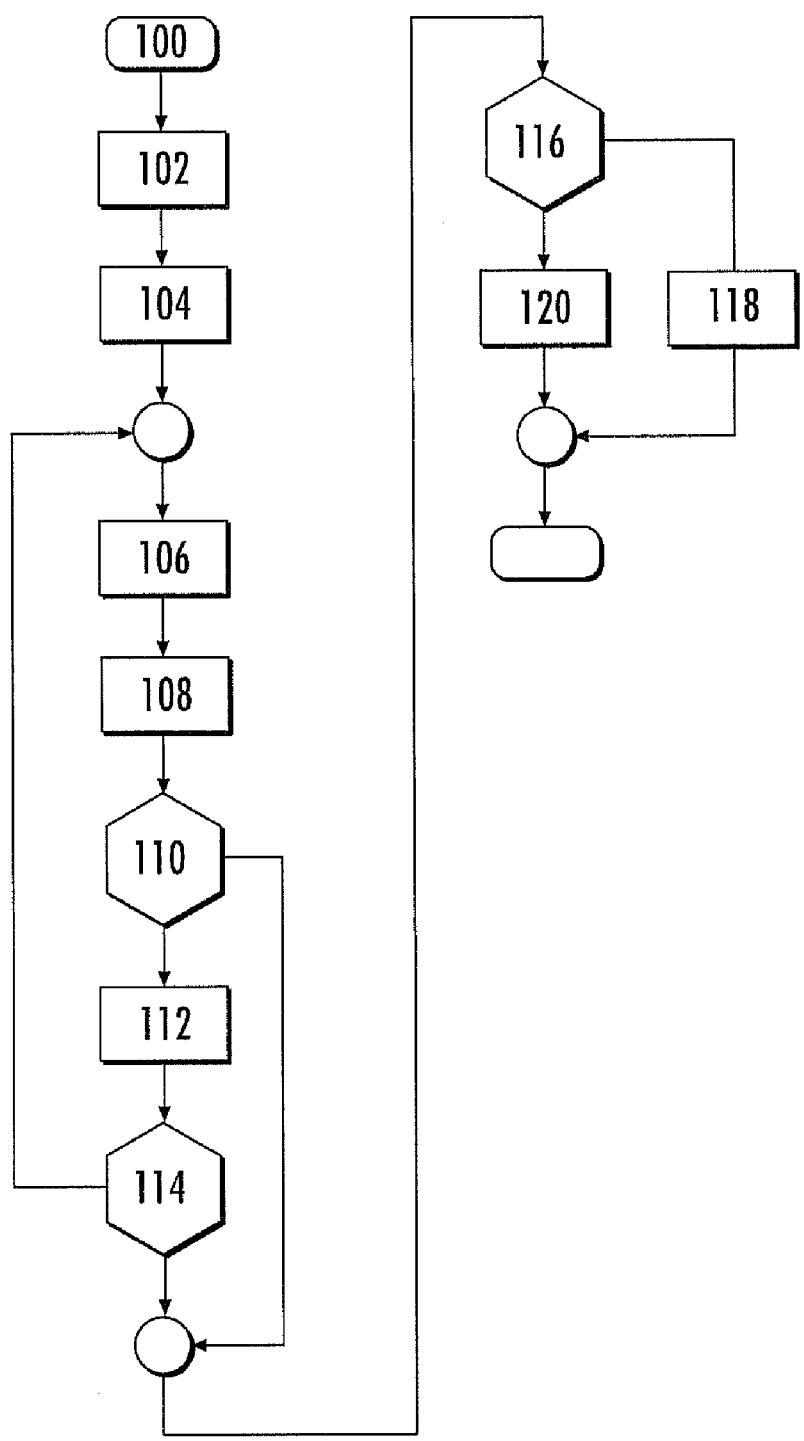

The invention relates to a method for identification of stationary or moving objects such as images, texts of physical items. The invention relates further to a digital camera, in particular for image processing in an industrial environment.

A number of industrial applications, for example, require the identification of objects which may be arranged at different positions within an observation window. For example, in the graphics industry, poorly folded or incorrect printed sheets must be identified and removed reliably in the region of gathering lines or collating lines for printed sheets. The identification of poorly folded or incorrect printed sheets is made more difficult because the individual printed sheets move continuously both in the gathering or collating direction and at right angles to it, and because successive printed sheets are rarely aligned such that they are completely flush with one another. In order, despite this, to allow reliable identification of poorly folded or incorrect printed sheets, complex and expensive processing systems are required, which demand high computation performances.

Problems with similar origins occur, for example, when supplying parts to be assembled in the correct orientation in production lines or when carrying out filling level inspections, which can often be carried out only visually, in the packaging industry.

The invention is based on the object of specifying a method which allows reliable identification of stationary or moving objects arranged in different positions within an observation window, without the computation performance required for such identification rising excessively.

This object is achieved by a method in which a digital representation, to be learned, of the object or a part of the object is produced first of all. After this, a search window is selected within the representation to be learned or within a detail of the representation to be learned, which search window occurs only once within the representation to be learned or within the detail. One or more search details is or are then selected within the search window, and forms or form a basis of the object identification.

The object identification can be carried out following the selection of the at least one search detail, for example, in such a way that a search is carried out within a digital representation to be evaluated, for a pattern whose contents and geometric shape correspond to the search detail determined using the representation to be learned. The representation to be evaluated in this case acts as an observation window, within which the object to be identified, or a part of the object to be identified, can be arranged in different positions.

In the method according to the invention, the greatest amount of computation effort in the primary field of actual object identification is advantageously used for finding one or more reliable search details, so that the object can be identified extremely quickly on the basis of the small amount of data in the search detail. The reduced computation effort for object identification makes it possible, in particular, to ensure the real-time capability of the method according to the invention. The invention is further based on the object of specifying a digital camera, in particular for industrial applications, which has a good recording quality.

This object is achieved by a digital camera having a housing within which a digital recording system is arranged, and having a light source which emits in the green wavelength band, illuminates at least a portion of the recording area of the digital camera, and is mounted within the housing or externally on the housing.

It has been found that green illumination of the recording area, in contrast to illumination with white light, simplifies in particular monochrome further-processing of colored objects such as images, texts or physical items. In particular, the contrast of color transitions in the red area or in the black area is considerably improved using green illumination of the recording area.

According to one preferred embodiment, the light source is arranged within the housing, in order to prevent mechanical damage to the light source in a rugged industrial environment. In order to achieve uniform illumination of the recording area, the light source may be in the form of a diffuse light source. The light source may have an annular or a rectangular extent. It is thus feasible for the light source to surround the recording system in an annular shape. An LED or an LED array is preferably used as the light source. In order to reduce reflections, it may be advantageous to arrange the light source inclined with respect to the recording plane.

The digital camera recording system preferably has a digital recording unit with, for example, a CMOS image sensor or a CCD image sensor. Since image sensors of this type are often highly sensitive to red, illumination of the recording area with the color green allows particularly advantageous results to be achieved in terms of the quality of the recorded image.

The digital recording system may furthermore have a digital signal processor which, for example, allows the exposure times or the light source to be controlled.

Imaging optics may also be part of the digital recording system. The imaging optics are preferably arranged within a tube provided with an external thread. For focusing, the external thread on the tube interacts, for example, with a complementary internal thread on the housing.

The digital camera according to the invention is preferably part of a system for identification of moving objects such as images, texts or physical items. The system also has a digital image processing unit, in order to evaluate the contents of the image signals recorded by the camera. The distance between the camera and the object to be recorded is preferably less than 5 cm.

According to one preferred embodiment, the system also has a conveyor apparatus, in order to move objects which are intended to be identified past the camera. The conveyor apparatus is preferably designed for conveying planar objects such as printed sheets.

The system may have two or more digital cameras. These cameras may be aligned with different areas of the same object, in order to improve the identification reliability. It is also possible to align the cameras with different objects, for example with different stations on a gathering or collating line for printed sheets.

In order to reduce the computation effort for evaluation of a representation which may contain the object to be identified, a characteristic search window of reduced size is determined, in a first step, within the representation to be learned of the object to be identified, or of a detail of it. This determination of the characteristic search window is associated with a first reduction in the amount of data to be evaluated for object identification. In a second step, this search window is reduced in size to a search detail having a specific geometric structure, such as a cross, a ring or a straight line. The search window is reduced in size to the search detail in this case in such a way that only specific areas within the search window are used as the search detail. The search detail thus advantageously has an amount of data reduced once again in comparison to that in the search window.

For reliable identification of whether the object to be detected is contained in the representation to be evaluated thus means, according to one embodiment of the invention, that it is now necessary only to find out whether the search detail determined on the basis of the representation to be learned is or is not included as a pattern within the representation to be evaluated. The identification process can be carried out quickly and with high reliability owing to the small amount of data in the search detail and the high level to which it characterizes the object to be detected.

One or more search details may be selected within the search window. The position of each search detail within the search window and the geometric shape of each search detail can be predetermined to be fixed irrespective of the contents of the search window or else can be defined dynamically as a function of the contents of the search window. Dynamic selection of the position of a search detail or of the geometric shape of the search detail can be carried out if the search window has predetermined contents, for example, in such a way that the search detail must have a specific, predetermined prominence.

According to the invention, the prominence of, for example, a search window or of a search detail is characterized by the number of different pixel contents in it, and by their frequency distribution. High prominence occurs when there are as many different pixel contents as possible, and the different pixel contents each occur with approximately the same frequency. A binary representation, for example, which comprises only black and white pixels, is optimally prominent when half of the pixels are black and the other half of the pixels are white. In a dynamic selection process, for example for the position of the search detail, this search detail is in consequence positioned within the search window in such a manner that the search detail comprises as many different pixel contents as possible, which each occur with approximately the same frequency.

The geometric shape of the search window and of the search detail can be selected as required. For example, the search window may be in the form of a rectangle, and the search detail in the form of a straight line or a ring. The search detail preferably has a linear shape, since determination of such a search detail within the representation to be learned, and/or of a corresponding pattern within the representation to be evaluated, involves the least computation effort. Thus, for example, two search details may be used which are in the form of straight lines running at right angles to one another and their position within the search window is defined dynamically.

According to one preferred embodiment, a comparison detail, which is defined in advance, is first of all selected within the digital representation of the object to be learned, and a characteristic search window is determined within this comparison detail. After selection of a search detail within the search window, the contents of the search detail and of the comparison detail of the representation to be learned, within which detail the search detail has been determined, and the relative position and orientation of the search detail or of the search window within this comparison detail are stored. A search is then carried out within the representation to be evaluated for a pattern which corresponds best to the search detail.

The pattern which corresponds best to the search detail can then be used as the basis for determining, within the representation to be evaluated, a comparison detail whose position and orientation relative to the pattern found match the position and orientation of the comparison detail of the representation to be learned, relative to the learned search detail. After this, the content of the comparison detail of the representation to be learned are compared with the contents of the comparison detail of the representation to be evaluated. If the two comparison details match apart from any error which may be set, the result of the object identification process is confirmation that the object to be identified has been found within the representation to be evaluated.

The reliability of the object identification process is improved since, when a pattern which corresponds to the learned search detail is found within the representation to be evaluated, a check is carried out to determine whether the areas which are adjacent to the learned search detail and to the pattern found and are in the form of comparison details match. According to the described embodiment, it is not the match between the learned search detail and the pattern, which is often noisy, which consequently governs the result of the object identification process, but the match between the two corresponding comparison details. This measure ensures that an object is still reliably identified in a representation to be evaluated even if it is rotated somewhat in comparison to the representation learned. In conventional object identification methods, on the other hand, objects which are rotated with respect to a learned representation cannot be identified, or can be identified only with very major computation effort, which precludes real-time identification.

The representation to be learned of the object to be identified is preferably subjected to preprocessing before selection of a search window. The representation to be evaluated and within which the object to be identified is looked for can also be subjected to corresponding preprocessing. Preprocessing is generally expedient, particularly in the case of those digital representations which have been generated, for example, from digitized video recordings.

The preprocessing of the representation may include various measures. Thus, for example, in the case of a monochrome representation, the representation can be subjected to gray-shade manipulation. If the contrast is low, for example, a considerable improvement in the identification probability can be achieved by gray-shade spreading, which makes full use of the available number of different gray shades.

The reliability of the identification method according to the invention can be improved further by smoothing the digital representation. Thus, for example, the line and quantization noise that occurs in digitized video recordings can be reduced considerably by binomial filtering.

The digital representation to be learned or the digital representation to be evaluated is advantageously subjected to edge extraction, by means of which color or gray-shade transitions contained in the homogeneous images are detected as edges. Such preprocessing of the digital representation is preferably carried out using a modified edge operator according to Prewitt.

A further improvement in the identification reliability can be achieved by binarization of the digital representation. During binarization, a previously defined threshold value is used to generate a black and white representation from the digital representation which, for example, comprises a large number of gray shades.

The preprocessing steps described above for the digital representation to be learned or the digital representation to be evaluated can be combined in any desired manner.

According to one preferred embodiment, histograms which reflect the frequency of the pixel contents that occur are produced from the representation to be evaluated and from the representation to be learned. If, in a specific case, it is impossible to select a search detail, these histograms can be used for object identification.

Figure 11:
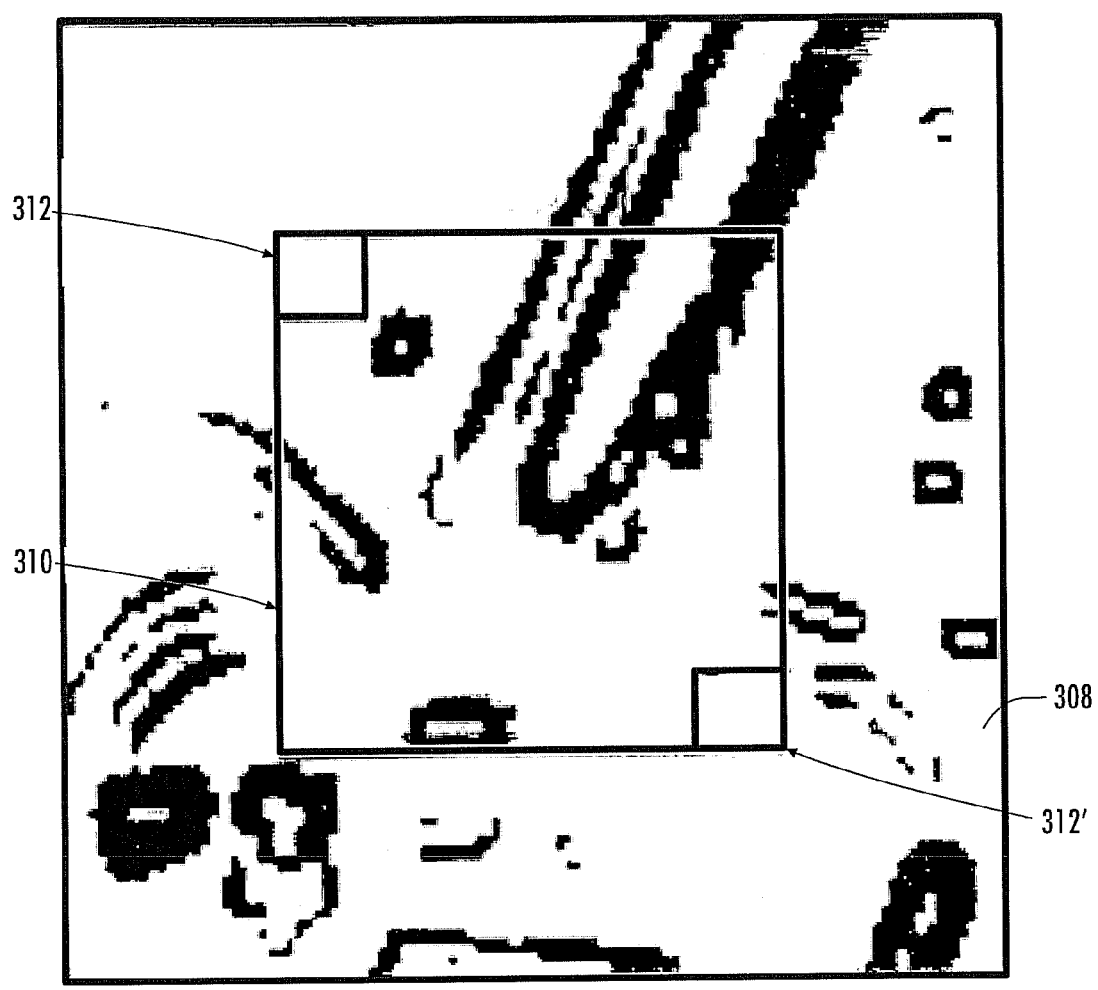
Figure 12:
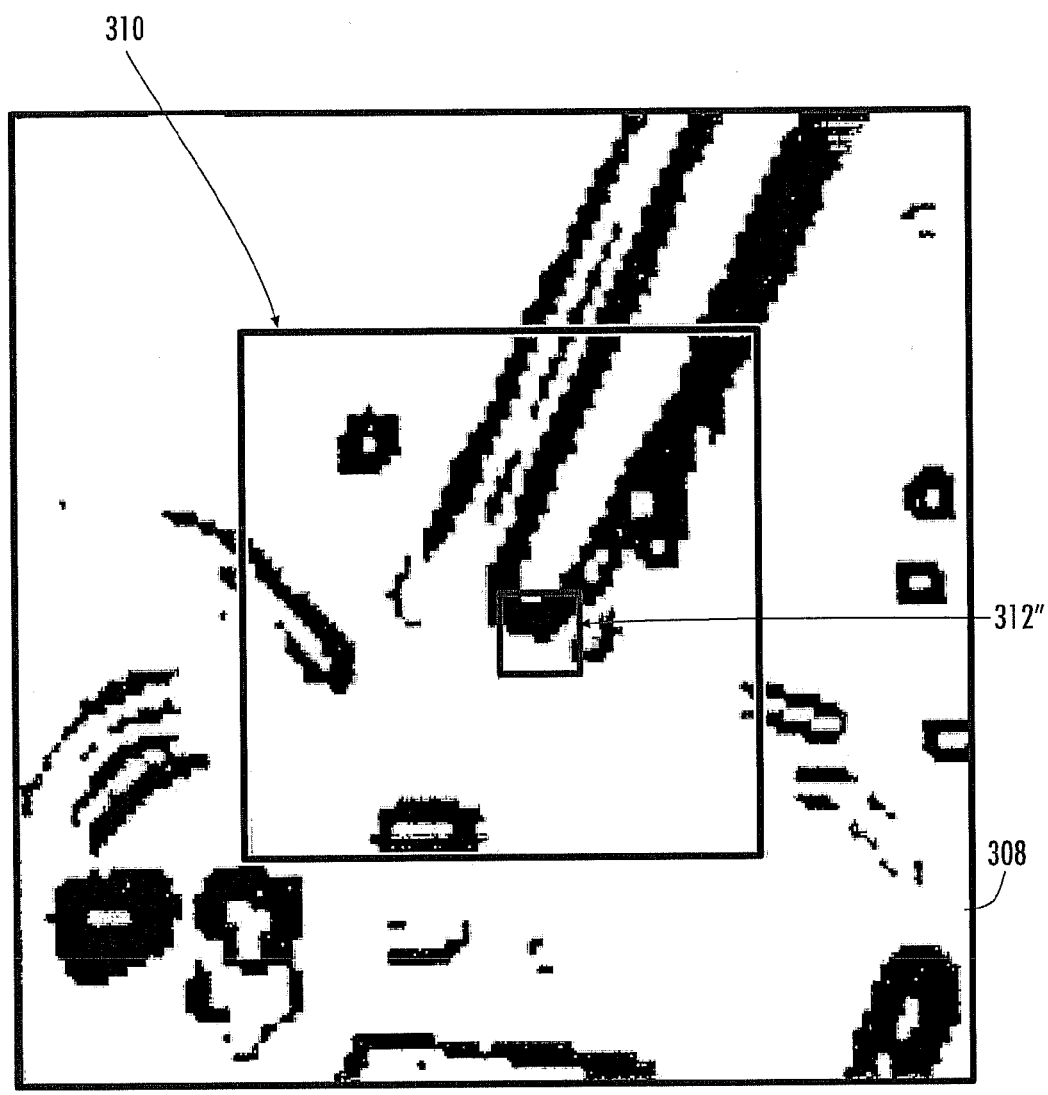
Figure 13:
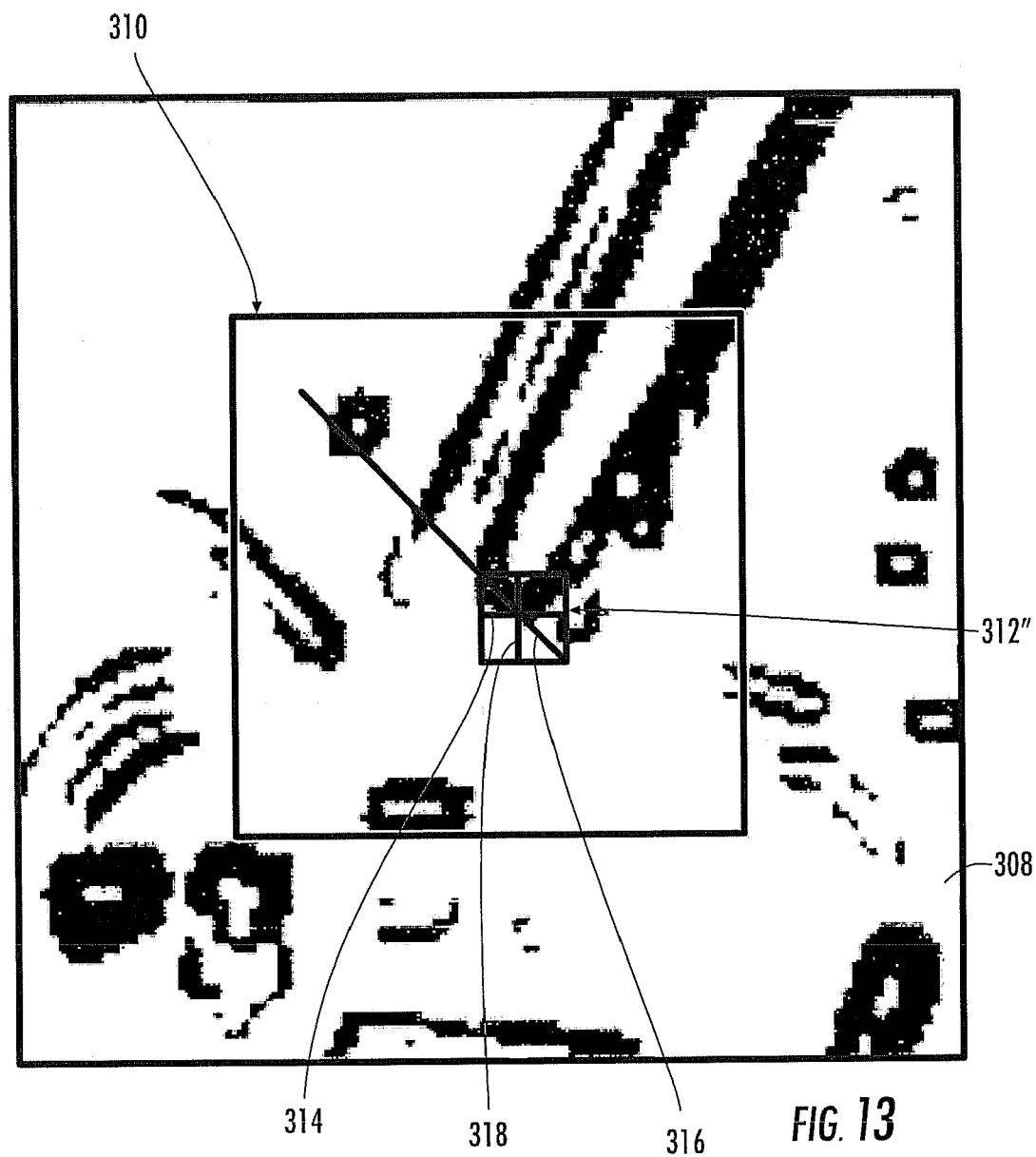
Figure 14:
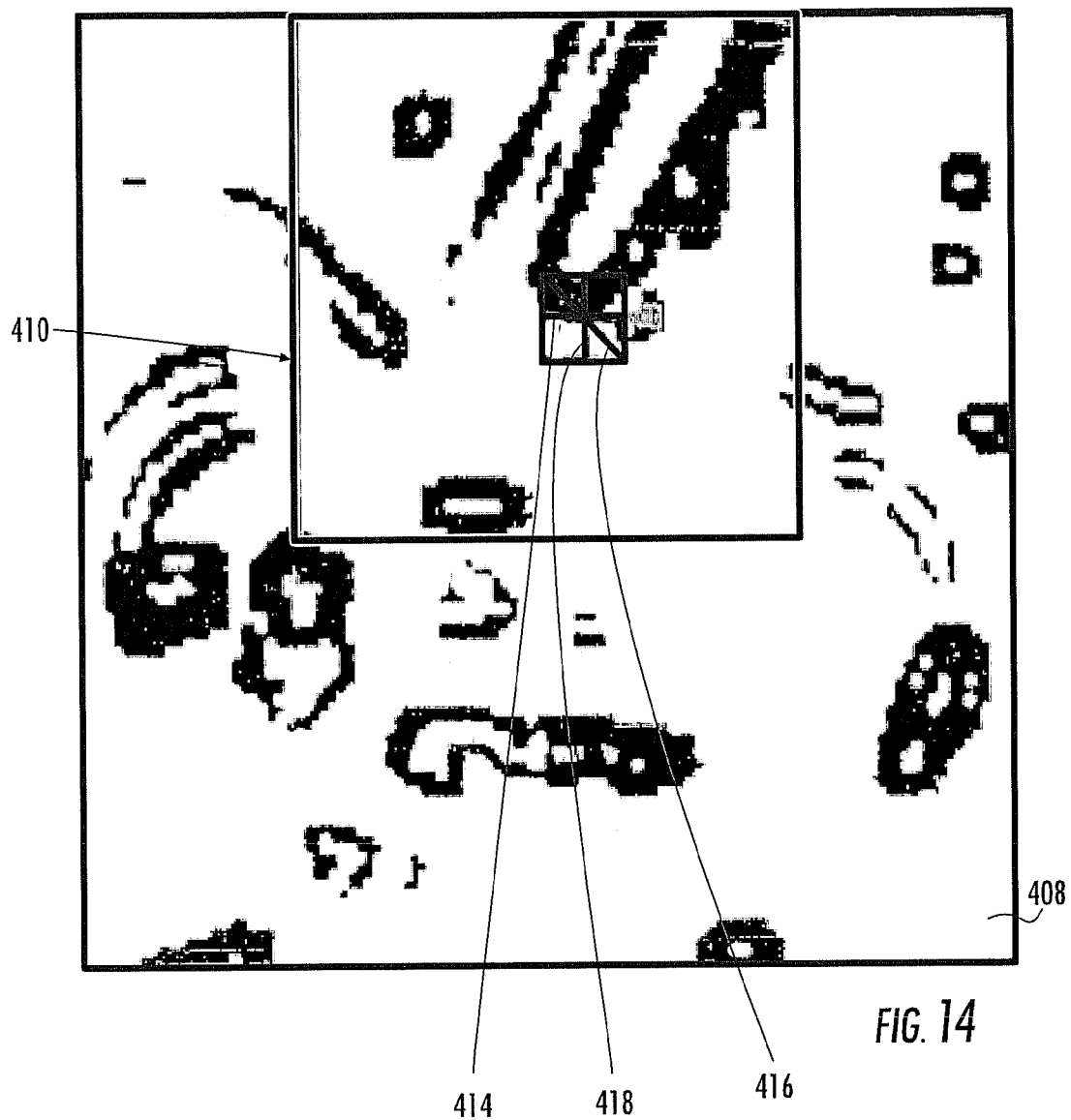
Figure 15:
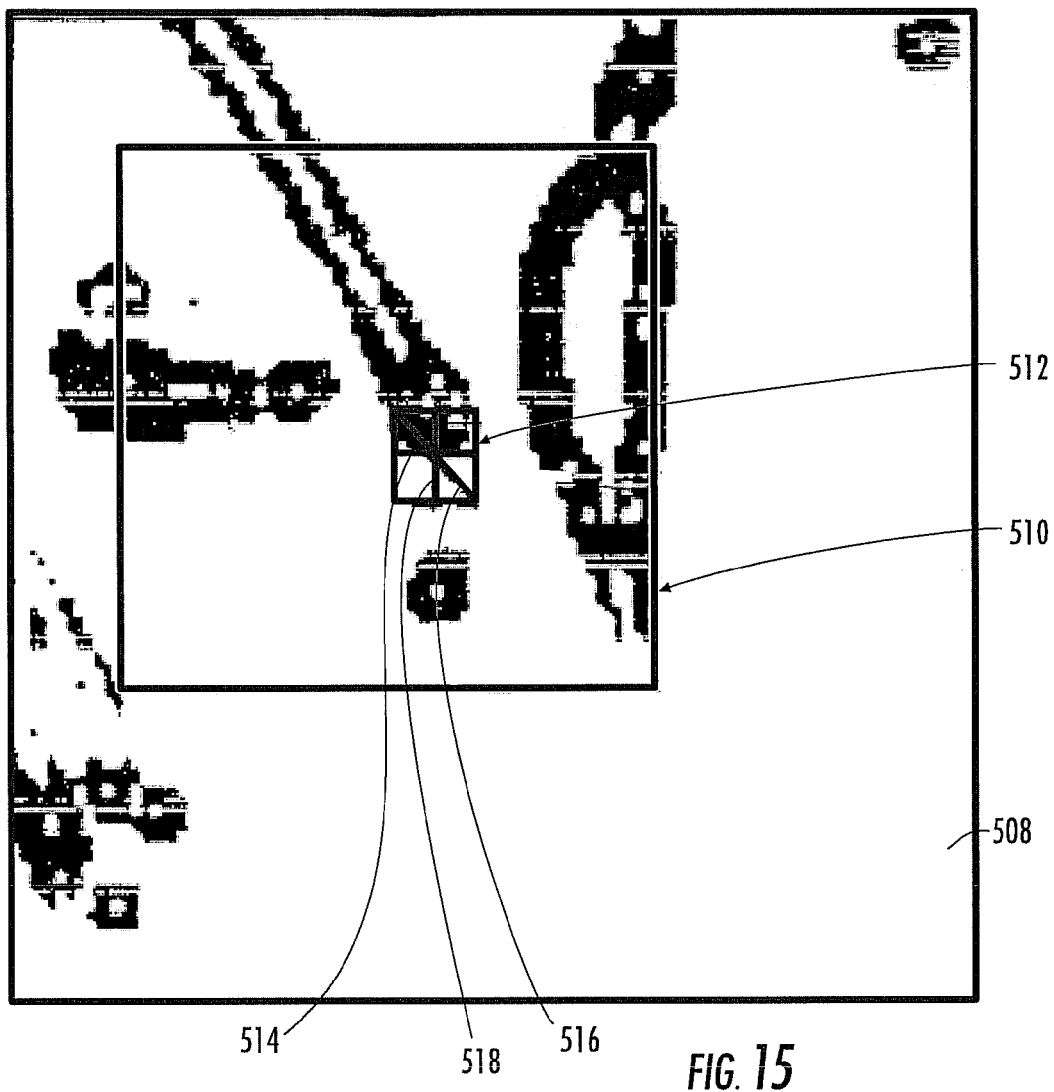

Further details and advantages of the invention result from the description of a preferred exemplary embodiment and from the figures, in which:

FIGS. 1 to 5: show schematic flowcharts of the method according to the invention for identification of objects;

FIGS. 6 to 10: show the preprocessing of a digital representation, to be learned, of the object to be identified;

FIGS. 11 to 13: show the selection of a search window within the representation to be learned, and the selection of a search detail within the search window; and FIGS. 14 and 15: show the identification of an object within a representation to be evaluated.

Figure 16:
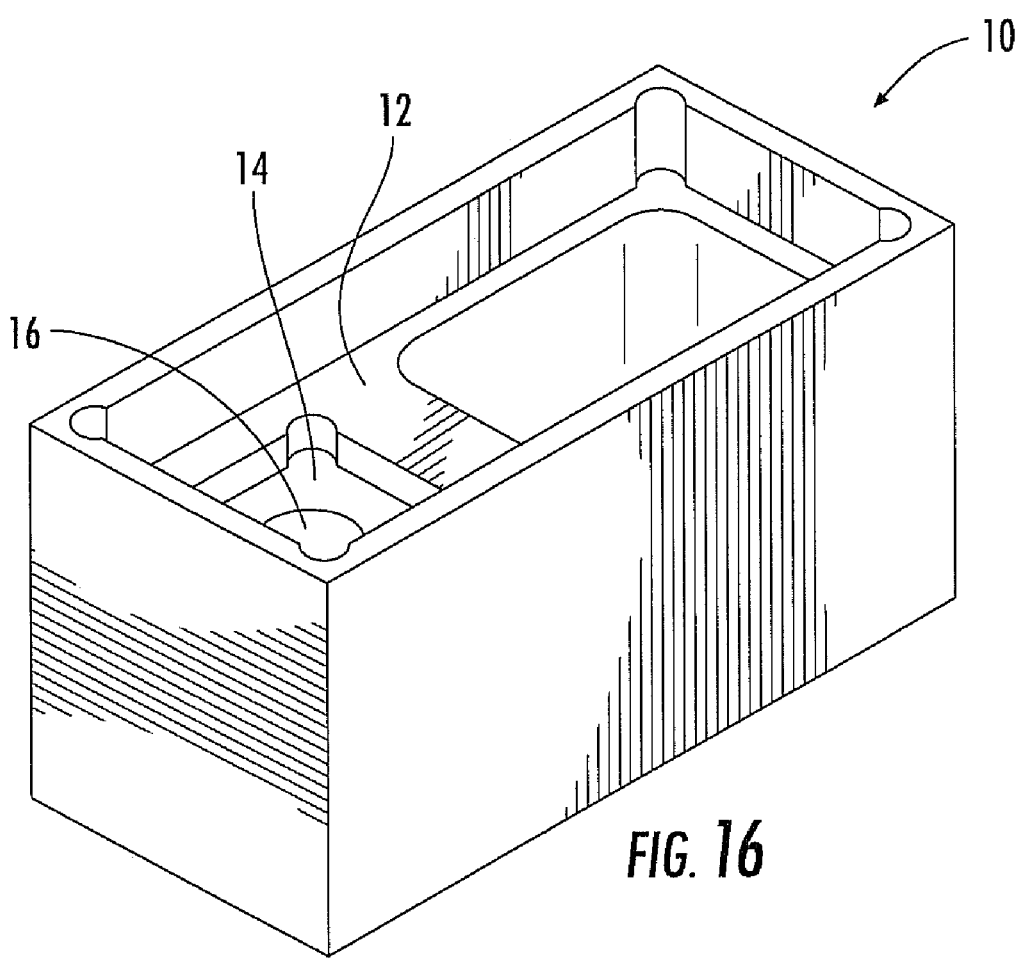

FIG. 16: shows the housing of a digital camera according to the invention.

Figure 17:
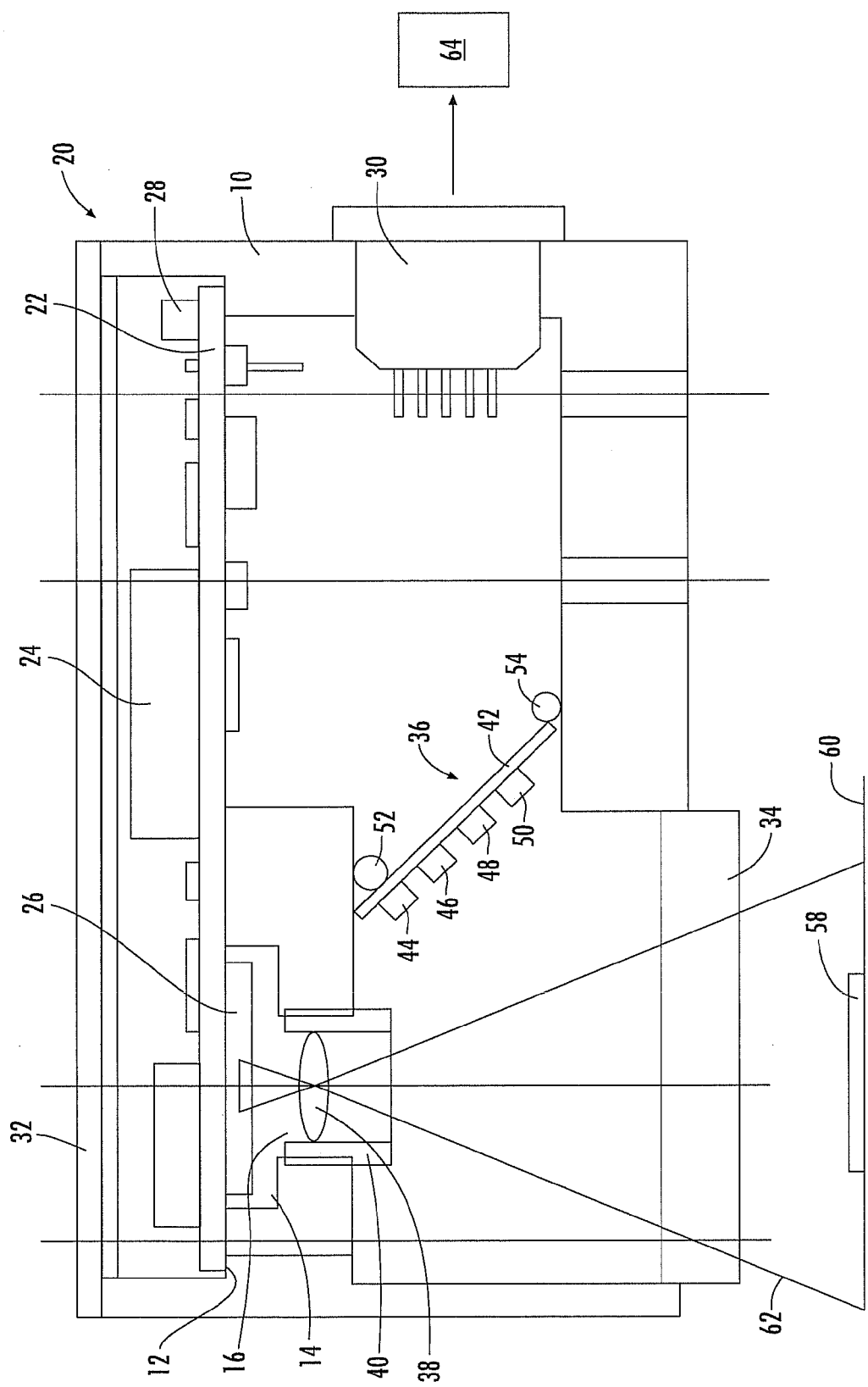
Figure 18:
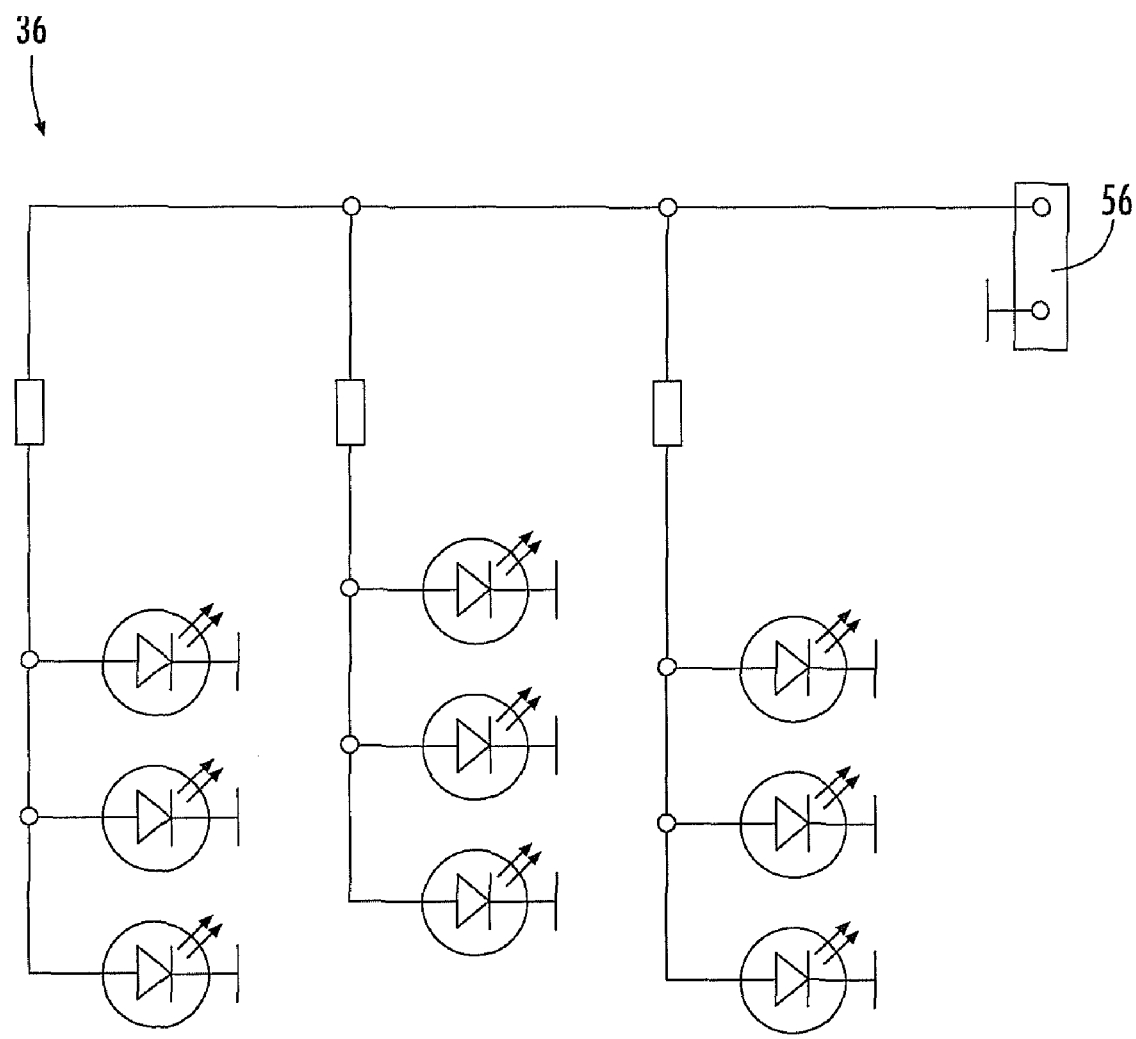

FIG. 17: shows a section illustration of the housing in FIG. 16 with components installed; and FIG. 18: shows a schematic illustration of the light source.

Figure 3:
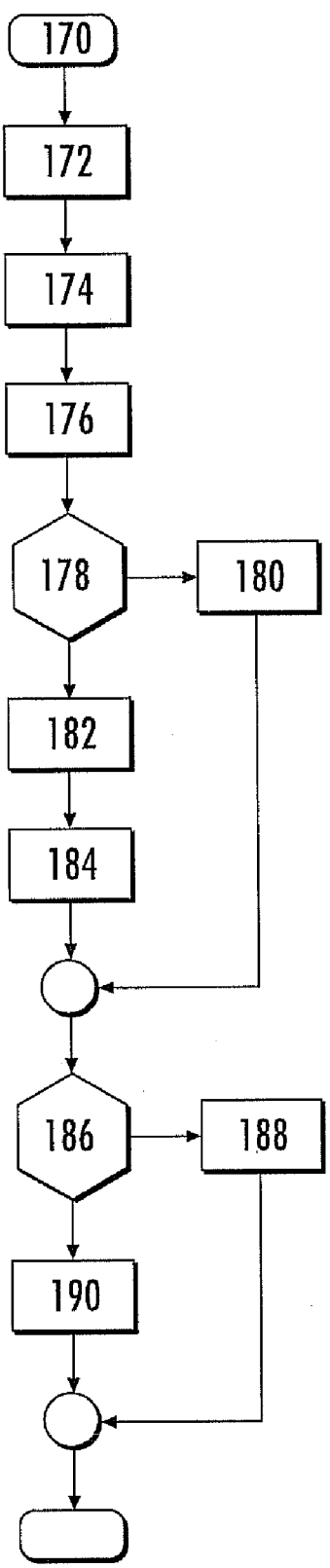
Figure 4:
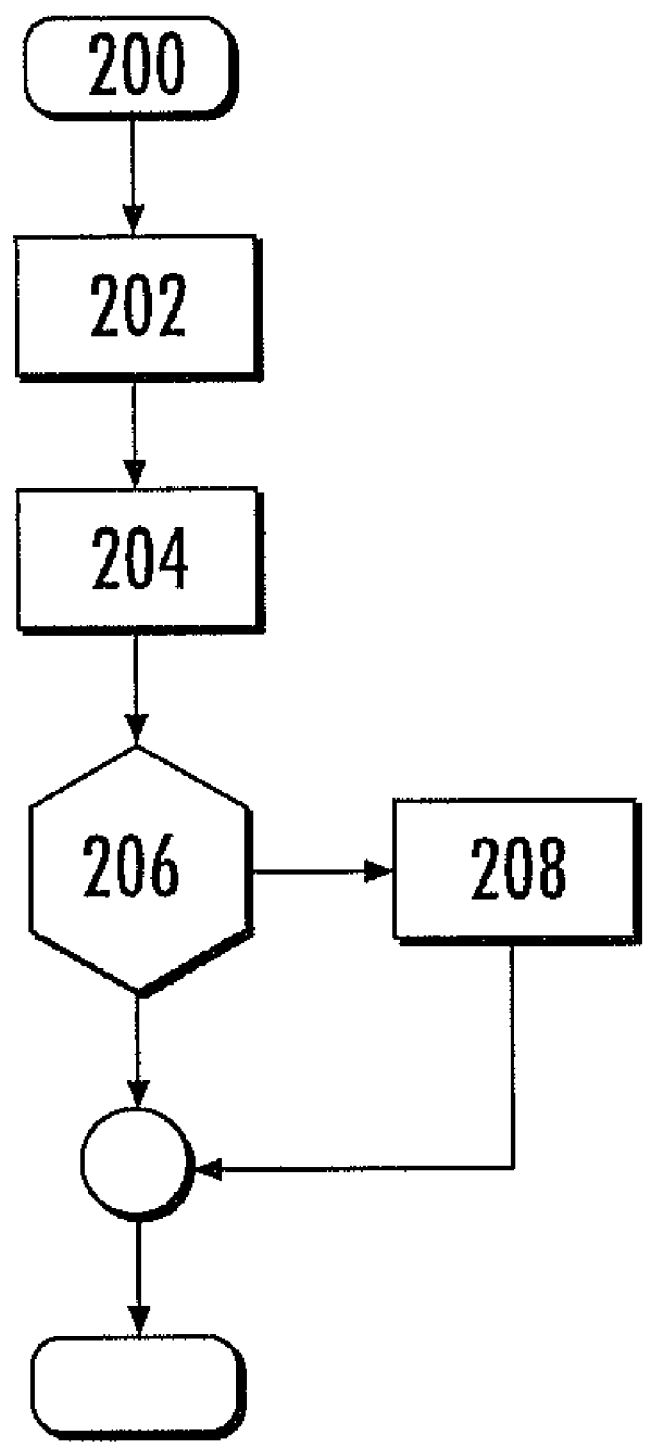
Figure 5:
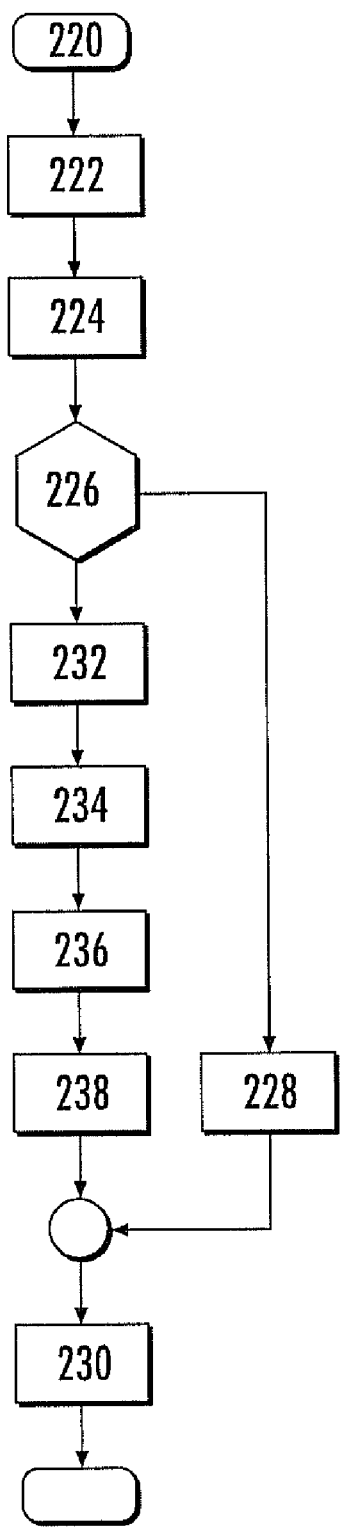

FIGS. 1 to 5 use flow charts to show a schematic exemplary embodiment of a method according to the invention for identification of objects. FIGS. 1 to 4 show the selection of a search window and of a search detail on the basis of a digital representation, to be learned, of the object, and FIG. 5 shows the procedure of searching for the object to be identified, within a representation to be evaluated.

FIG. 1 shows the procedure 100 for evaluation of a representation to be learned, with regard to the question as to whether there is a prominent, noise-free search detail within the representation to be learned.

In a first step 102, a recording apparatus in the form of a camera records an analog representation of a detail of the object to be identified. A frame grabber in a digital signal processor then passes this analog recording in the form of a monochrome digital representation on for further processing using a data processing system. A digital camera which produces a digital representation directly could also be used instead of an analog camera and a frame grabber.

In a subsequent step 104, this monochrome representation of a detail of the object to be identified is subjected to gray-shade manipulation. In this case, the minimum and maximum gray shades which occur in the monochrome representation to be learned are determined first of all. After this, linear gray-shade spreading is carried out in order to improve the contrast in the representation to be learned. If, for example, only gray shades from 7 to 54 occur, on a gray-shade scale from 0 to 255, within the representation to be learned, then three further gray-shade representations with linear gray-shade spreads of, for example, 0 to 63, 0 to 127 and 0 to 255 are generated from this original gray-shade representation. A table (look-up table) is then used, which contains the original and the three spread gray shades for each pixel in the representation to be learned. This table in consequence comprises various gray-shade representations of the recording made by the digital camera.

The gray-shade representation which is to be processed at the time is then loaded, in step 106.

The gray-shade representations are then classified in step 108 to determine whether they contain a search detail of sufficient prominence. To this end, the loaded gray-shade representation is preprocessed in a first step, in order to simplify the search for a characteristic search window and a prominent search detail.

In step 108, a search is carried out in a number of runs and with different preprocessing parameters for a characteristic search window and a prominent search detail contained in it. If it is found that the currently loaded gray-shade representation is not sufficiently prominent to allow a search window or a search detail to be determined, then the gray-shade representation is classified as being monochrome. However, if both a characteristic search window and a prominent search detail contained in it can be found, the current gray-shade representation is checked for noise. To this end, the contents of the search detail are determined a number of times at identical positions in the current gray-shade representation, using the most recently set preprocessing parameters. If the respectively determined search detail contents have relatively major discrepancies, then the gray-shade representation is classified as being noisy.

After this, in step 110, a check of the current gray-shade representation is carried out to determine whether it has been classified as being monochrome or noisy. If this is the case, then, in step 112, either the preprocessing parameters are changed or, if all the preprocessing parameters have already been checked, the next gray-shade representation is defined from the table used in step 104. The process then moves onto step 106 once again, unless it is found in step 114 that all the preprocessing parameters and the all the gray-shade representations have already been checked.

If it is found in step 110 that the current gray-shade representation is neither monochrome nor noisy, or if it is found in step 114 that all the gray-shade representations and all the possible preprocessing parameters have already been processed, then a check is carried out in step 116 to determine whether it has been possible to define a prominent search detail for the representation to be learned. If this is not the case, then, in step 118, a central area of the representation to be learned is defined as a comparison detail, and this is assessed using a gray-shade histogram. This gray-shade histogram is stored, and subsequently forms the basis for object identification in a representation to be evaluated. Object identification with the assistance of gray-shade histograms will be described in more detail further below, with reference to FIG. 5.

However, if it is found in step 116 that the representation to be learned allows the determination of a prominent search detail, then, in step 120, the coordinates and the contents of the search detail are stored, as well as the contents of a comparison detail which contains the search detail and is defined within the representation to be learned. Furthermore, the table with the gray-shade representations and the preprocessing parameters used, such as the edge divisor and binarization threshold, are stored.

After step 118 or step 120, the procedure 100 for evaluation of the representation to be learned with regard to the question as to whether the presentation to be learned contains a prominent, noise-free search detail, is ended. Representations to be evaluated can now be investigated with the assistance either of the stored search detail or of the stored histogram to determine whether they do or do not contain the object to be identified. This procedure is described further below, with reference to FIG. 5. However, first of all, FIG. 2 will be used to explain in more detail the procedure 130 for classification of the representation to be evaluated. This procedure 130 corresponds essentially to steps 106 to 120 in FIG. 1.

First of all, in step 132, the gray-shade representation currently to be loaded from the table for the representation to be learned is defined. A threshold for the binarization of the representation to be evaluated is then set to an initial value.

Then, in step 134, an edge divisor for edge extraction is set to an initial value. The edge divisor indicates the gray shade in the region of a gray-shade transition for which an edge is defined. Depending on the value of the edge divisor, the edge is shifted in the direction of lighter or darker gray shades. The modified edge operator according to Prewitt is used for edge extraction.

The current gray-shade representation is first of all loaded in a subsequent step 136. The current gray-shade representation is then subjected to smoothing by means of binomial filtering. A central comparison detail, within which the search window will subsequently be determined, is then defined in the gray-shade representation to be evaluated.

Then, in step 136, this comparison detail, which has a smaller size and, in consequence, also a small amount of data than the current gray-shade representation, is used to produce a histogram, which indicates the gray-shade distribution of the comparison detail.

Then, in step 136, the current value of the edge divisor is halved, and the comparison detail is subjected to edge extraction. Following the edge extraction process, the comparison detail is converted to a binary representation on the basis of the current binarization threshold. In this binary representation, each of the pixels in the comparison detail assumes one of two possible values, depending on the value of the binarization threshold. In the following text, these two values are referred to, for illustrative purposes, as "black" and "white". Finally, in step 136, the ratio of the black pixels to the white pixels within the comparison detail is calculated.

A check is carried out in step 138 to determine whether the current comparison detail has a sufficiently high prominence level. This check confirms whether the ratio determined in step 136 for the black pixels to the white pixels is within an adjustable tolerance band around the optimum value of 0.5. If the prominence of the current comparison detail is sufficiently high then, in step 140, a search is carried out for a characteristic search window within the current comparison detail, and for a prominent search detail within the determined search window. If not, the comparison detail is classified, in step 142, as being monochrome.

Following the search for a prominent search detail in step 140 and the classification of the comparison detail as monochrome in step 142, a check is carried out in step 144 to determine whether a prominent search detail has been found or whether the edge divisor has assumed its lowest possible value. If the result of this check is negative, then, from step 136, a loop is passed through once again with half the edge divisor but with the other settings being unchanged.

If, on the other hand, it is found in step 144 that a prominent search detail has been found or that the edge divisor has assumed is lowest possible value, then a check is carried out in step 146 to determine whether a prominent search detail has been found in step 140. If this is the case, then this search detail is tested for noise, in step 148. For this purpose, the contents of a search detail arranged at identical positions are investigated a number of times in the current gray-shade representation using the current preprocessing parameters (binarization threshold and edge divisor). If the contents of the search details arranged at identical positions do not show any relatively major discrepancies, the search detail that has been found is classified as being noise-free, otherwise is it classified as being noisy.

If it is found in step 146 that no prominent search detail has been found, or if it is found in step 146 that a prominent search detail has been found and this search detail has been tested for noise in step 148, then the binarization threshold is raised in step 150.

Once the binarization threshold has been raised in step 150, a check is carried out in step 152 to determine whether a prominent and noise-free search detail has been found or whether the binarization threshold has assumed its maximum possible value. If the result of this check is negative, another loop is passed through from step 134, in which the edge divisor is once again set to its initial value. If not, the counter for the current gray-shade representation is incremented, in step 154.

Following the increment of the counter for the current gray-shade representation in step 154, a check is carried out in step 156 to determine whether a prominent and noise-free search section has been found, or whether the current gray-shade representation is the last gray-shade representation contained in the table produced in step 104. If the result of this check is negative, another loop is passed through from step 132, in which the binarization threshold is once again set to its initial value, and the next gray-shade representation is loaded.

If, on the other hand, it is found in step 156 that a prominent and noise-free search detail has been found or that the last gray-shade representation contained in the table produced in step 104 has been reached, then the representation to learned is classified in step 158. The representation to be learned is classified as binary if a noise-free and prominent search detail has been found. If the search detail has been classified in step 142 as being monochrome, then the representation to be learned is likewise classified as being monochrome. If the search detail has been classified as being noisy in step 148, then the representation to be learned is likewise classified as being noisy, in step 158. The classification procedure 130 is ended once step 158 has been processed.

Figure 2:
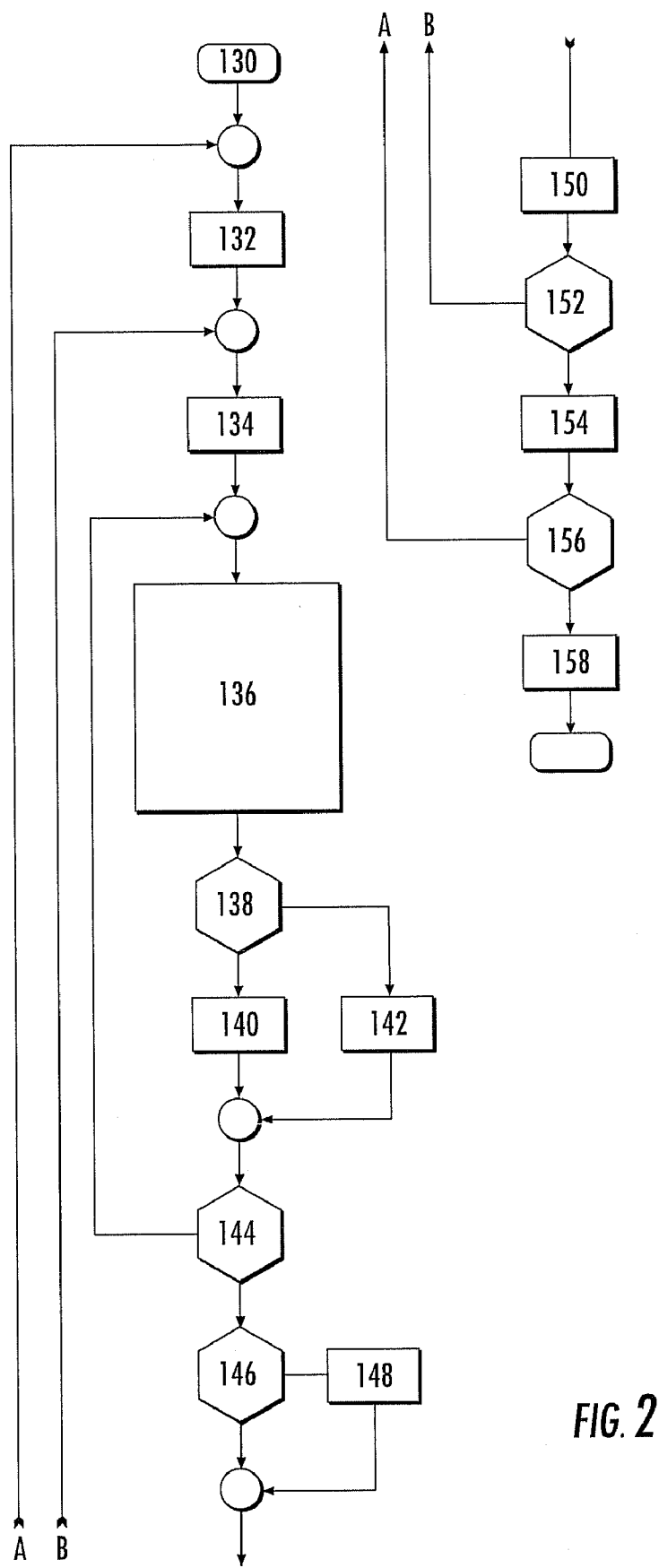

FIG. 3 shows, in more detail, the procedure 170 for searching for a characteristic search window within the comparison detail generated in step 136 in FIG. 2, and for a search detail within any search window which has been found. The procedure 170 illustrated in FIG. 3 corresponds essentially to step 140 in FIG. 2.

In order to search for a characteristic search window within the comparison detail, all the search windows contained within this comparison detail are first of all investigated for their prominence, in step 172. The closer the ratio of black pixels to white pixels in a search window is to the optimum value of 0.5 in this case, the higher is the prominence of the corresponding search window. The prominence determined for each search window is stored.

Then, in step 174, all those search windows which have a certain similarity are filtered out, in order to determine a search window which is characteristic for the comparison detail. In this case, all those search windows in which the number of pixels above a predetermined threshold value is identical are classified as being similar.

Then, in step 176, the search window having the greatest prominence is selected from the remaining characteristic search windows. If a number of characteristic search windows having the same high prominence are found, then the first of these search windows within the representation to be learned is selected. This is because, in practice, it has been found that the identification rate of the identification method according to the invention is not increased significantly if a different search window with the same high prominence is selected. Furthermore, in step 176, the coordinates of the selected characteristic search window are stored.

A check is carried out in step 178 to determine whether the search window selected in step 176 corresponds to predetermined prominence criteria. If this is not the case, the search window is classified in step 180 as not being prominent. If, on the other hand, it is found in step 178 that the search window corresponds to the predetermined prominence criteria, then, in step 182, the respective prominence is determined for two search details in the form of straight lines running at right angles to one another, and for all possible positions of these two straight lines within the search window.

Then, in step 184, the two search details having the highest prominence are selected. Furthermore, the initial coordinates of the two selected search details within the search window are stored.

A check is then carried out in step 186 to determine whether the selected search window and the selected search sections each have a prominence which is above a preset value. If this is not the case, then the representation to be evaluated is classified in step 188 as being monochrome. Otherwise, in step 190, the contents of the two search details are stored. In addition to the contents of the two search sections, whose position within the search window is defined dynamically, the contents of a third, fixed-position search detail in the form of a straight line which passes through the search window diagonally, are also stored. Furthermore, the representation to be evaluated is classified in step 190 as a binary representation.

FIG. 4 shows the procedure 200 for filtering out similar search windows in more detail. This procedure corresponds to step 174, illustrated in FIG. 3.

First of all, in step 202, the contents of a current search window are stored for comparison. Then, in step 204, the contents of this search window are compared with the contents of all the other possible search windows within the comparison detail. If any similar search windows are identified, these are masked out. If a check in step 206 shows that at least one search window which is similar to the current search window has been found, the current search window is likewise masked out, in step 208. The procedure 200 for finding a search window which is characteristic of the respective comparison detail is continued until all the possible search windows within the comparison detail have been investigated for similarity with other search windows within the comparison detail.

According to the method steps described in FIGS. 1 to 4, a representation to be learned is either classified as a binary representation or else as being noisy or monochrome. If the representation to be learned is classified as being noisy or monochrome, then a stored gray-shade histogram of the representation to be learned is used for object identification in a representation to be evaluated. In the case of a binary representation, on the other hand, object identification in a representation to be evaluated is carried out with the assistance of the stored search details. FIG. 5 shows the object identification process 220 according to the invention within a representation to be evaluated, in more detail.

In a first step 220, a camera is used to produce an analog recording, which will be checked for the presence of the object to be identified. This analog recording is provided for further processing in the form of a monochrome representation to be evaluated, by a frame grabber in a digital signal processor.

In step 224, the representation to be evaluated is smoothed with the assistance of binomial coefficients. In addition, a gray-shade histogram of the representation to be evaluated is generated.

A check is carried out in step 226 to determine whether the learned representation has been classified as a binary representation. If this is not the case, that is to say if the learned image has been classified as noisy and monochrome, the histogram of the representation to be evaluated is compared, in step 228, with the stored histogram of a comparison detail of the learned representation. The comparison result obtained is output in step 230. If the gray-shade diagram of the representation to be evaluated and the gray-shade histogram of the comparison detail of the learned representation are not below a similarity level which can be set, the comparison result is positive, otherwise it is negative.

If, in contrast, it is found in step 226 that the learned representation is a binary representation, then, in step 232, this binary representation is subjected to edge extraction and to binarization. The edge divisor and the binarization threshold are used in this case, for which the contents of the search details have been stored in the representation to be learned.

Then, in step 234, a search is carried out for that pattern within the representation to be evaluated which produces the best match with the search structure defined by the three learned search details. The coordinates of this pattern are stored.

Then, in step 236, a comparison detail within the representation to be evaluated is defined in such a manner that the position of this comparison detail in the representation to be evaluated matches, relative to the pattern which has been found, the position of the comparison window of the representation to be learned, relative to the search details which have been learned. Both comparison details are of the same size.

Then, in step 238, the contents of the comparison detail of the representation to be evaluated are compared with the stored contents of the comparison detail of the representation which has been learned.

The comparison result is output in step 230. In this case, identification of the object within the representation to be evaluated can be assumed if the only discrepancies between the comparison detail of the representation to be evaluated and the corresponding comparison detail of the learned representation effect a predetermined number of pixels.

FIGS. 6 to 13 shows the selection of a characteristic search window and of prominent search details within the characteristic search window, on the basis of an example. In this case, FIGS. 6 to 10 first of all show the procedure for preprocessing a digital camera recording 300.

Figure 6:

FIG. 6 shows the recording 300 by a digital camera. The recording 300 was produced by a digital camera having a conventional video module. The resolution of the recording 300 is 580 pixels×380 image lines. The digital camera provides a monochrome image of the recorded object. The object illustrated in FIG. 6 is a detail of a photograph, which is intended to be used as the representation to be learned.

Since the representation which is illustrated in FIG. 6 and is to be learned has comparatively little contrast, this recording is first of all subjected to gray-shade manipulation.

Figure 7:
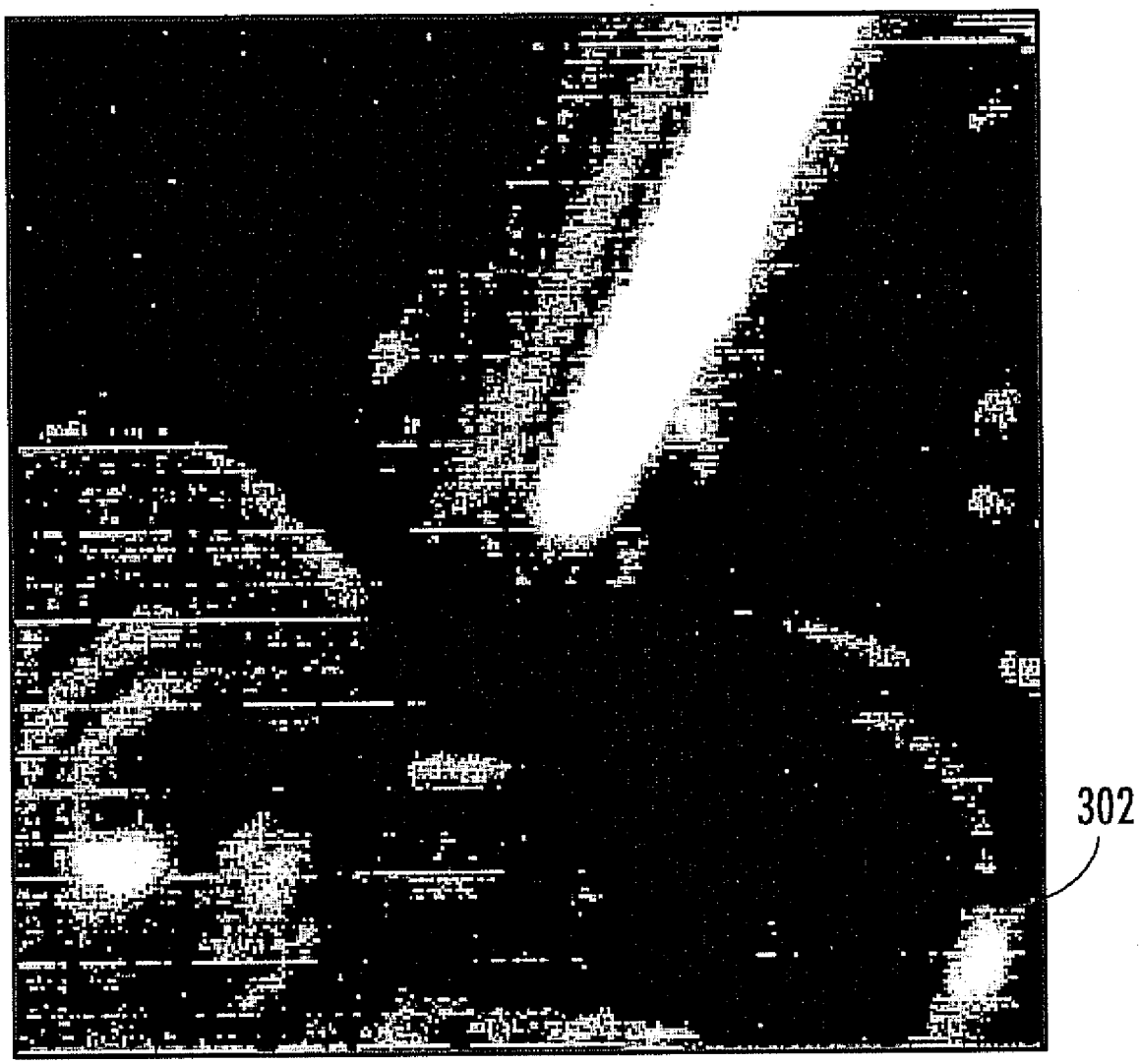

FIG. 7 shows the representation 302 to be evaluated, which has been subjected to gray-shade spreading and is obtained from the recording 300 illustrated in FIG. 6. The improved contrast can clearly be seen.

Figure 8:

Following the gray-shade manipulation, the representation to be evaluated is smoothed using binomial coefficients. The smooth representation 304 is shown in FIG. 8.

Figure 9:
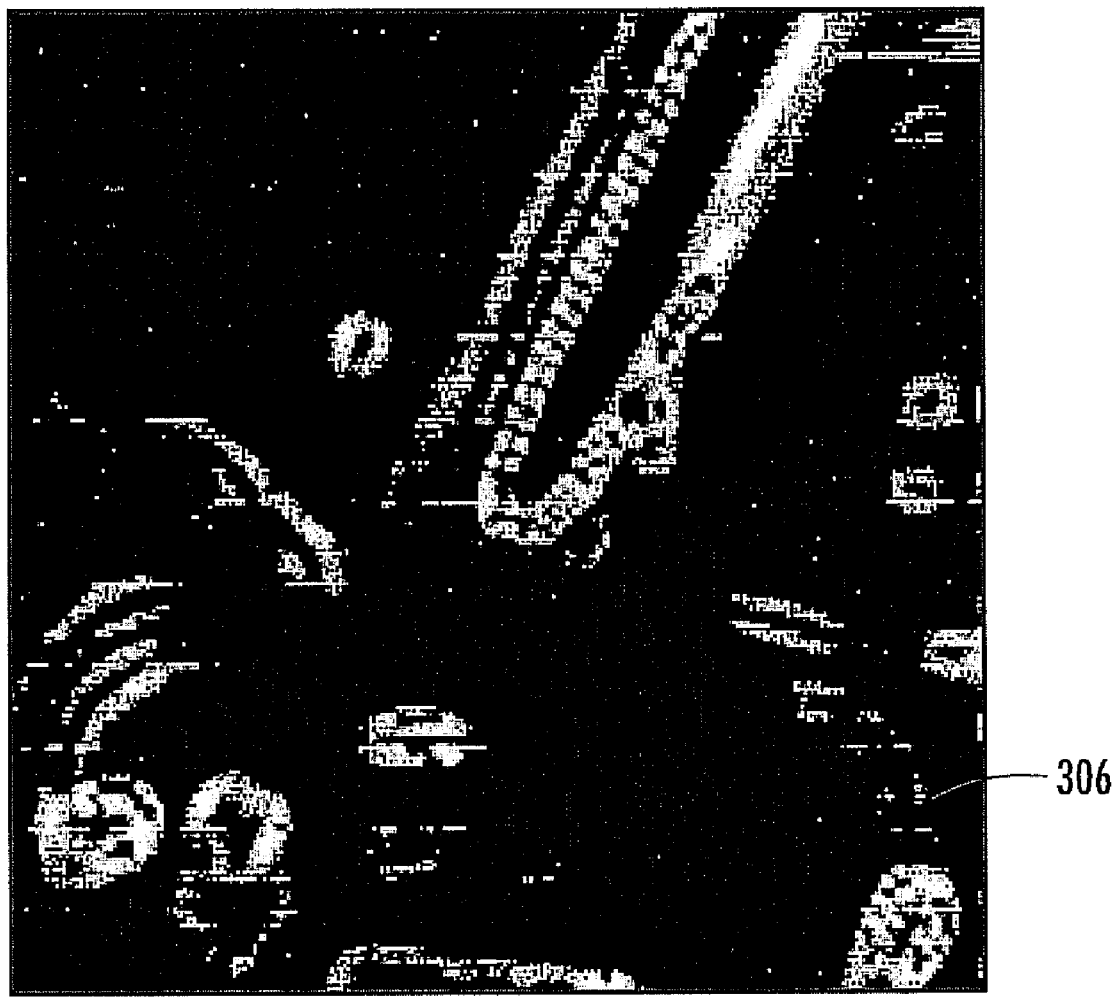

The smooth representation is then subjected to edge extraction. A modified edge operator according to Prewitt is used to produce the edge representation 306, as illustrated in FIG. 9, from the smoothed representation 304 illustrated in FIG. 8. The edge representation 306 now essentially contains only highly characteristic image information.

Figure 10:
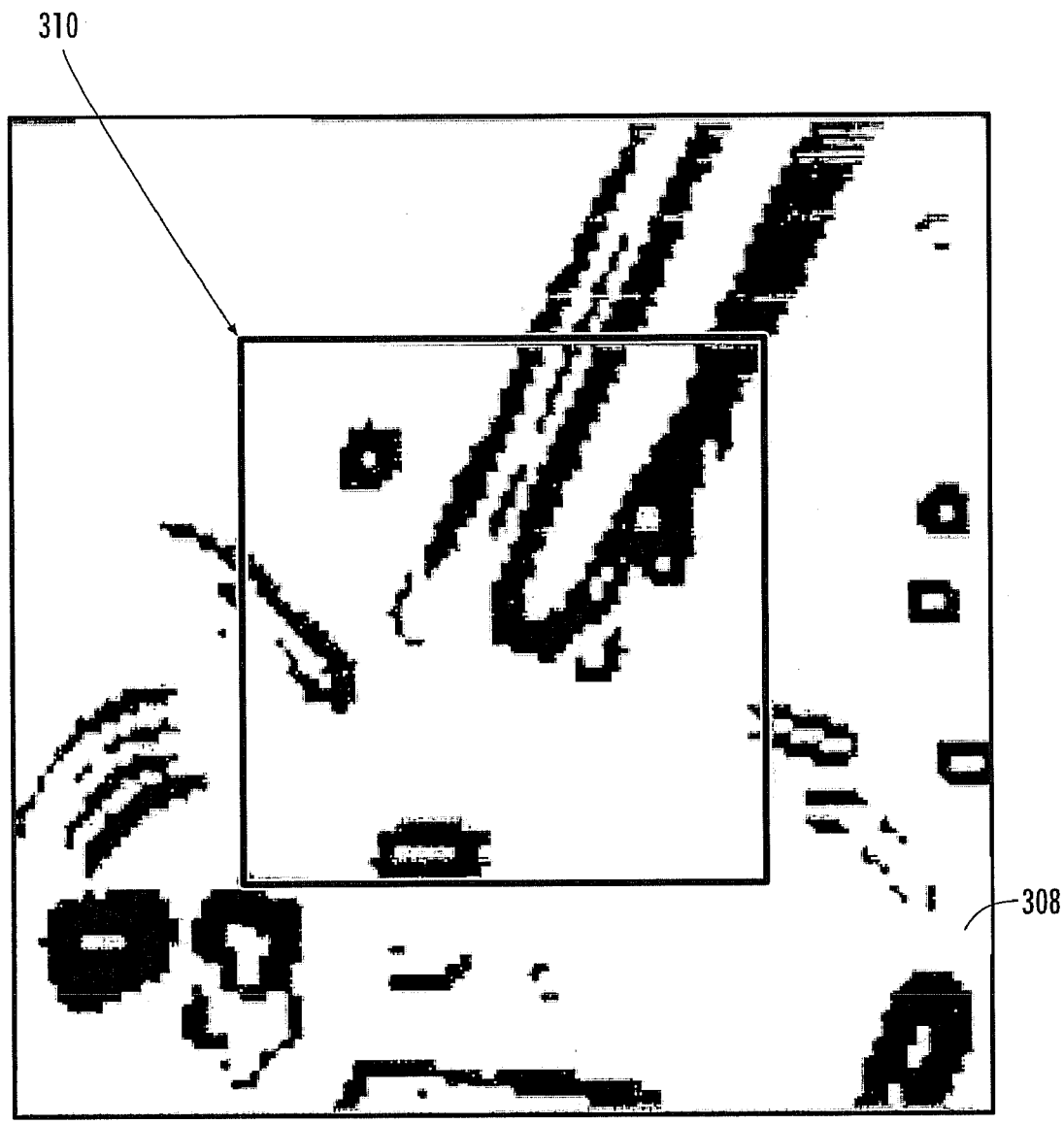

The final step in the preprocessing of the recording produced by the digital camera is to use a suitable binarization threshold to produce the binary representation 308 which is shown in FIG. 10 and is to be learned, from the edge representation 306 shown in FIG. 9. This binary representation 308 forms the basis for determining a characteristic search window and prominent search details.

The representation 308 to be learned in FIG. 10 has a size 104×104 pixels. A comparison detail 310 comprising 56×56 pixels is first of all defined in the center of the representation 308. A search window which is characteristic of the comparison detail 310 is then determined within this comparison detail 310. Since there is in each case a distance of 24 pixels between the sides of the representation 308 and the sides, top and bottom of the comparison detail 310, the comparison detail 310 illustrated in FIG. 10 and, hence, also a search window arranged in this comparison detail 310, can now reliably be found within a representation to be evaluated, even if the object to be evaluated is shifted upward, downward, to the left or to the right by a maximum of 24 pixels in comparison to the representation 308 shown in FIG. 10.

As shown in FIG. 11, once a comparison detail 310 has been defined within the representation 308, a search window is determined which occurs only once within the comparison detail 310 and is thus characteristic of the comparison detail. The two search windows 312, 312' illustrated by way of example in FIG. 11 have a size of 14×14 pixels. The comparison detail 310, which has a size of 42×42 pixels, thus contains 1764 possible windows. As explained in conjunction with FIGS. 3 and 4, each of the 1764 possible search windows is now checked for prominence and dissimilarity from the other search windows.

FIG. 12 shows a search window 312", which has high prominence and, furthermore, occurs only once within the comparison detail 310. As explained with reference to FIG. 3, three prominent search details are now determined within this search window 312".

FIG. 13 corresponds to FIG. 12, but with three search details 314, 316, 318 in the form of straight lines being placed within the search window 312". A search detail 316 running diagonally within the search window 312" is always rigidly anchored in the search window 312". Its initial coordinates are 0, 0 within the search window 312". The positions of a second, horizontal search detail 314 and of a third, vertical search detail 318 are, in contrast, selected dynamically within the search window 312 such that they have as high a prominence as possible. In the example shown in FIG. 13, all three linear search details 314, 316, 318 have approximately optimum prominence. This means that each search detail 314, 316, 318 is in each case composed approximately half and half of black and white pixels.

Both the initial coordinates of the three search details 314, 316, 318 and their contents are stored. The contents of the comparison detail 310 and the determined preprocessing parameters are likewise stored. This completes the procedure for evaluation of the representation to be learned.

FIGS. 14 and 15 show the object identification process with the assistance of the search details learned in the manner explained above. FIG. 14 shows a representation 408 of the same object which, for example, is also shown as 308 in FIG. 13. However, this object has been shifted upward slightly in the representation 408 in FIG. 14.

The representation 408, which was recorded by a digital camera and is to be investigated for the presence of the object, has likewise been subjected, in the same way as the representation to be learned, to gray-shade manipulation, smoothing, edge extraction and binarization. In this case, the preprocessing parameters used were the same as those already used for preprocessing the image to be evaluated.

The representation 408 to be evaluated is then investigated with the aid of the learned search details to determine whether it contains a pattern whose contents and shape correspond to those of the three learned search details. Since the representation 408 to be evaluated actually contains a pattern 414, 416, 418 which matches a search structure in the form of the three learned search details, the position of this pattern 414, 416, 418 within the representation 408 to be evaluated is then determined. The position of the pattern 414, 416, 418 makes it possible to determine a comparison detail 410, whose relative position and orientation in respect of the pattern 414, 416, 418 match the position and orientation of the stored search detail relative to the search details which have been learned.

Once the comparison detail 410 has been loaded from the representation 408 to be evaluated, the contents of this search detail 410 from the representation 408 to be evaluated are compared with the stored contents of the comparison detail 310 from the representation 308 to be learned (FIG. 13). Since the two comparison details 410 and 310 have matching contents, the object to be identified is identified in the representation 408 to be evaluated.

The object to be identified can now be identified reliably in the representation 408 to be evaluated even if the position and orientation of the object to be identified in the representation 408 to be evaluated differ from the position and orientation of the object in the learned representation 308 (FIGS. 10 to 13), provided that a pattern corresponding to the learned search details can still be found within the representation 408 to be evaluated.

FIG. 15 illustrates the situation in which, although it has been possible to find a corresponding pattern 514, 516, 518 within the representation 508 to be evaluated, with the aid of the three stored search details, the contents of the comparison detail 510 arranged within the representation 508 to be evaluated do not match the learned comparison detail 310 (FIG. 13). The object to be identified is, in consequence, not identified in the representation 508 to be evaluated.

The method described is particularly suitable for identification of objects which, for example, are moved continuously past a recording apparatus in order to produce a recording of the objects. The objects to be identified in this case carry out a relative movement with respect to the recording apparatus. The method according to the invention is preferably used for identification of printed sheets which are arranged in the region of a gathering or collating line.

FIG. 16 shows the housing 10 of a digital camera according to the invention. The housing 10 is used to accomodate all the optical and electronic assemblies of the digital camera.

In order to allow the digital camera to be used in a rugged industrial environment, the housing 10 is milled from machine construction aluminum, and is designed to be dust-tight.

The housing 10 has a holder, which is in the form of a rest 12, for a printed circuit board which is not illustrated in FIG. 16 but which is fit with major electronic components to the digital camera. A holder 14 for a digital recording unit is provided in the region of this rest 12 for the printed circuit board. There is a hollow-cylindrical opening 16 in the base of this holder 14, for the digital recording unit. This hollow-cylindrical opening 16 is provided with an internal thread and is used to accommodate the imaging optics of the digital camera.

FIG. 17 shows a section view of the digital camera 20, which has the housing 10 shown in FIG. 16.

A printed circuit board 22 is fixed on the rest 12 in the housing 10 by means of silicone adhesive. The printed circuit board 22 is fit with a digital signal processor 24, a digital recording unit 26 in the form of a CMOS image sensor, a clock-serial digital RS422 interface 28 and various other components such as a voltage supply IC. A connection 30 for the digital interface 28 arranged on the printed circuit board 22 is provided on the side of the housing 10. The digital camera 20 can be connected by means of the connection 30 to an image processing unit 64.

The housing 10 is closed on an upper face by a housing cover 32. On a lower face of the housing 10, a covering glass 34 allows an object 58 to be detected by the CMOS image sensor 26. At the same time, the covering glass 34 closes the housing 10 such that it is dust-tight. The object 58 is arranged on a coveyor apparatus 60 within a recording area 62 of the digital camera 20.

The digital signal processor 24 of the digital camera 20 has a computation performance of at least 40 MIPS and allows the evaluation of recorded details in a typical area of 11×11 mm (104 pixels). Larger recording details having a greater number of pixels can also be evaluated by increasing the computation performance of the digital signal processor 24. The digital signal processor 24 is used, inter alia, for controlling the exposure times of the CMOS image sensor 26 and of LED illumination 36, the conversion of the parallel image data from the CMOS image sensor 26 to a clock-serial format which is insensitive to interference, image pre-processing, histogram production and color or grey-shade manipulation.

The CMOS image sensor 26 arranged in the holder 14 in the housing 10 is intended for providing image signals. The CMOS image sensor 26 records the object 58 using various resolutions, and can produce both monochrome image signals and color image signals.

Imaging optics 38 in the form of a lens are arranged in the circular-cylindrical opening 16 formed at the bottom of the holder 14 for the CMOS image sensor 26. The lens is mounted within a tube 40 which interacts, via an external thread, with a complementary internal thread in the opening 16. The thread makes it possible to set the focusing of the distance between the CMOS image sensor 26 or the object 58 and the lens 38.

The tube 40 is an M 10×0,5 threaded tube. A number of such tubes 40 having different lenses 38 with different focal lengths are kept available, and are inserted into the opening 16 on the housing 10 depending on the application, in order to select the recording section.

A major component of the digital camera 20 is the diffuse green LED illumination 36, which is integrated in the housing for illuminating the object to be recorded. The green LED illumination 36 is not strictly monochromatic as in the case, for example, of a green laser, but the small proportion of red light in the spectrum of the green LED illumination 36 complements the high red-light sensitivity of the CMOS image sensor 26 in a synergistic manner. The combination of diffuse LED illumination 36 and the CMOS image sensor 26 has thus been found to be optimum in practice.

The LED illumination 36 has a printed circuit board 42 and a number of light sources 44, 46, 48, 50 in the form of 5 mm LEDs. The printed circuit board 42 is fixed in the housing 10 with the aid of a silicone adhesive 52, 54.

The printed circuit board 42 with the LEDs 44, 46, 48, 50 arranged on it includes an angle of approximately 45° with the recording plane. This inclined alignment of the LED illumination 36 relative to the recording plane prevents undesirable reflections and is optimal with respect to the small amount of space available within the housing 10 resulting from the desired miniaturization of the digital camera 20.

FIG. 18 shows the schematic design of the LED illumination 36 from FIG. 17. The LED illumination 36 has a total of nine green diffuse 5 mm LEDs, three of which are in each case connected in parallel. The three branches which each comprise three parallel-connected LEDs are likewise connected in parallel. An electrical connection for the printed circuit board 22 illustrated in FIG. 17 is produced via a contact 56. The geometrical arrangement of the nine LEDs on the printed circuit board 42 illustrated in FIG. 2 corresponds essentially to the circuit arrangement illustrated in FIG. 18. This means that the array formed by the nine light-emitting diodes illustrated in FIG. 18 essentially defines a rectangle.

The digital camera 20 according to the invention and sketched in FIGS. 16 to 18 is suitable for a large number of industrial applications, owing to its small dimensions of only 70.0 mm×32.0 mm×38.0 mm. All the sensitive components of the digital camera are protected against mechanical damage within the robust housing 10, so that the digital camera sketched in FIGS. 16 to 18 is particularly suitable for use in the area of, for example, gathering or collating lines of printed sheets with a large number of rotating parts. The space conditions in the region of these gathering or collating lines are extremely confined. The typical distance between the lower face of the covering glass 34 illustrated in FIG. 2 and the printed sheets is, for example, generally only 25 to 27 mm.

The invention claimed is:

1. A method for the automated identification of objects each including substantially the same images, texts or items, comprising the steps of:

preparing a digital representation (308) to be learned of an object or part of the object;

defining a comparison detail (310) in the representation (308) to be learned, selecting a search window (312) that is prominent within the comparison detail (310); and learning at least one search detail (314, 316, 318) which is in the form of a straight line, two straight lines running at right angles to one another or a ring within the search window (312), to be used for object identification, carrying out a search within an object containing a digital representation (408) to be evaluated for a pattern (414, 416, 418) corresponding to said search detail (314, 316, 318), the position of the search detail (314, 316, 318) within the search window (312) being fixedly predetermined or defined dynamically in dependence on the content of the search window (312), and wherein said method automatically identifies moving objects.

2. A method for the automated identification of objects each including substantially the same images, texts or items, comprising the steps of:

preparing a digital representation (308) to be learned of an object or part of the object;

defining a comparison detail (310) in the representation (308) to be learned, selecting a search window (312) that is prominent within the comparison detail (310); and learning at least one search detail (314, 316, 318) which is in the form of a straight line, two straight lines running at right angles to one another or a ring within the search window (312), to be used for object identification, carrying out a search within an object containing a digital representation (408) to be evaluated for a pattern (414, 416, 418) corresponding to said search detail (314, 316, 318), the position of the search detail (314, 316, 318) within the search window (312) being fixedly predetermined or defined dynamically in dependence on the content of the search window (312), and wherein said comparison detail (310) to be defined is located substantially at the center of the representation (308).

* * * * *